United States Patent
Sarfi et al.

(10) Patent No.: US 10,331,394 B1
(45) Date of Patent: Jun. 25, 2019

(54) MANIPULATING SHARED SCREEN CONTENT

(71) Applicant: LogMeIn, Inc., Boston, MA (US)

(72) Inventors: David Sarfi, Veszprem (HU); Botond Szentannai, Budapest (HU); Istvan Hoffmann, Szigetszentmiklos (HU)

(73) Assignee: LogMeIn, Inc., Boston, MA (US)

( * ) Notice: Subject to any disclaimer, the term of this patent is extended or adjusted under 35 U.S.C. 154(b) by 0 days.

(21) Appl. No.: 15/851,321

(22) Filed: Dec. 21, 2017

(51) Int. Cl.
*G06F 3/14* (2006.01)
*G06F 9/4401* (2018.01)
*H04L 29/08* (2006.01)

(52) U.S. Cl.
CPC .......... *G06F 3/1454* (2013.01); *G06F 3/1423* (2013.01); *G06F 9/4411* (2013.01); *H04L 67/025* (2013.01)

(58) Field of Classification Search
CPC ...... G06F 3/1454; G06F 3/1423; G06F 3/048; G06F 3/0481; G06F 3/0484; G06F 9/4411; H04L 67/025; H04N 21/258; H04N 21/6587; G06Q 10/10; G06Q 10/101; G06Q 10/103; G09G 5/14
See application file for complete search history.

(56) References Cited

U.S. PATENT DOCUMENTS

| | | | |
|---|---|---|---|
| 6,522,334 B2 | 2/2003 | Schauser | |
| 7,827,139 B2 | 11/2010 | Schauser et al. | |
| 9,269,072 B2 | 2/2016 | Alexandrov et al. | |
| 2006/0277482 A1* | 12/2006 | Hoffman | G06F 3/0481 715/764 |
| 2007/0260742 A1* | 11/2007 | Clark | G11B 27/002 709/231 |
| 2009/0254824 A1* | 10/2009 | Singh | G01C 21/3679 715/716 |
| 2010/0017745 A1* | 1/2010 | Kikuchi | G06F 3/1454 715/781 |
| 2010/0045567 A1* | 2/2010 | Lin | G06F 3/1454 345/1.1 |
| 2013/0278484 A1* | 10/2013 | Hwang | G06F 3/1423 345/2.3 |
| 2014/0365957 A1* | 12/2014 | Louch | G06F 3/1431 715/790 |
| 2015/0067591 A1* | 3/2015 | Nancke-Krogh | G06F 3/0481 715/804 |
| 2015/0169205 A1* | 6/2015 | Yajima | G06F 3/0481 715/799 |
| 2016/0180167 A1* | 6/2016 | Watts-Englert | G06F 16/35 715/748 |
| 2016/0231872 A1* | 8/2016 | Tamura | G06F 3/048 |

* cited by examiner

*Primary Examiner* — Tom V Sheng
(74) *Attorney, Agent, or Firm* — BainwoodHuang

(57) ABSTRACT

A technique for sharing screen content of a host machine with a client machine includes identifying multiple screen regions formed by image features within screen content of the host machine and enabling a user of the client machine to move selected screen regions to desired screen locations on the client machine, while leaving unselected screen regions in place. For example, when the user of the client machine selects and drags a particular screen region, the client machine creates a new window and displays the screen contents of the selected screen region in the new window, which the user may place and resize as desired.

24 Claims, 9 Drawing Sheets

MANIPULATING SHARED SCREEN CONTENT

BACKGROUND

Screen sharing is a common feature of many software applications, such as remote desktop, web conferencing, and web presentation applications. Such software applications typically involve a host machine, such as a computer, which may share screen content with one or more client machines. The shared screen content may include the host machine's entire desktop or selected portions thereof, such as content of one or more applications or monitors.

In a typical remote desktop session, a client machine displays a desktop of a remote host machine, and a user of the client machine operates the host machine by remote control. The client machine displays the remote desktop within a window on the client machine, and the user of the client machine is able to move, resize, or minimize the window, as desired.

SUMMARY

Unfortunately, options for displaying and interacting with shared screen content are often limited. For example, the user of a client machine might display a remote host desktop or application in a window of a desired size. The size of the window might work fairly well overall, but it may be too small to enable easy access to certain features or controls, such as small buttons. The user can enlarge the window, but doing so might cause certain portions of the remote screen to extend off-screen locally, such that the user has to scroll or perform other manipulations to view desired portions. As a consequence, user experience and productivity may suffer.

In contrast with prior screen-sharing approaches, which are limited in their flexibility, an improved technique for sharing screen content of a host machine with a client machine includes identifying multiple screen regions formed by image features within screen content of the host machine and enabling a user of the client machine to move selected screen regions to desired screen locations on the client machine, while leaving unselected screen regions in place. For example, when the user of the client machine selects and drags a particular screen region, the client machine creates a new window and displays the screen contents of the selected screen region in the new window, which the user may place and resize as desired.

By allowing the display of different portions of host screen content in respective locations on the client machine, the improved technique enhances user experience and productivity. For example, the user of the client machine need not be limited to a single window that can only have one size at a time. Rather, the user can create one or more additional windows for holding selected screen content, resizing the windows independently as desired and placing the windows at convenient and easily accessible locations on the client screen. For example, the user may select a screen region that holds a toolbar of a host application, enlarge the toolbar in its own window, and place the toolbar wherever it is easy to access, while leaving the rest of the remote screen content intact in its original window.

In addition, it would also be desirable to allow the user of the client machine to create copies of shared screen content in a freeform manner. To this end, additional techniques are directed to receiving a user action of drawing a closed shape in a window that displays shared screen content from a host machine. In response to the user action, the client machine creates a new window and displays the contents of the drawn shape in the new window. In an example, the client machine may create any number of copies of screen contents with each copy rendered in its own window, which the user may place and resize as desired.

Further, it would also be desirable to prevent private or other non-shareable screen content on the host machine from being displayed on the client machine when performing screen sharing from the host machine to the client machine. To this end, further improved techniques are directed to identifying, by the host machine, non-shareable elements in the screen content of the host machine and, prior to sending the screen content of the host machine to the client machine for rendering by the client machine, selectively blurring the non-shareable elements, such that the client machine receives the screen content of the host machine with the non-shareable elements already blurred. In various examples, the host machine blurs screen contents based on a black list or a white list and selectively applies blurring to applications, folders, web domains, and/or notifications. Such host-based blurring protects the host user's privacy by blurring non-shareable content, while allowing the display of shareable content on the client machine without blurring.

Certain embodiments are directed to a method of displaying screen content of a host machine on a client machine. The method includes rendering the screen content of the host machine in a first window on the client machine and identifying multiple screen regions formed by image features within the first window. The method further includes receiving, by the client machine, a user selection of a set of selected screen regions within the first window. The set of selected screen regions include at least one of the multiple screen regions but exclude a set of unselected screen regions in the first window. In response to the user selection, the method still further includes creating a second window on the client machine, the second window containing screen content within the set of selected screen regions but excluding screen content within the set of unselected screen regions.

Other embodiments are directed to a computerized apparatus constructed and arranged to perform a method of displaying screen content of a host machine, such as the method described above. Still other embodiments are directed to a computer program product. The computer program product stores instructions which, when executed on control circuitry of a computerized apparatus, cause the computerized apparatus to perform a method of displaying screen content of a host machine, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

An improved technique for sharing screen content of a host machine with a client machine includes identifying multiple screen regions formed by image features within screen content of the host machine and enabling a user of the client machine to selectively move any of the screen regions to desired screen locations on the client machine, while leaving unselected screen regions in place. By displaying different portions of host screen content in respective, user-assigned locations, the improved technique enhances user experience and productivity.

Figure 1:
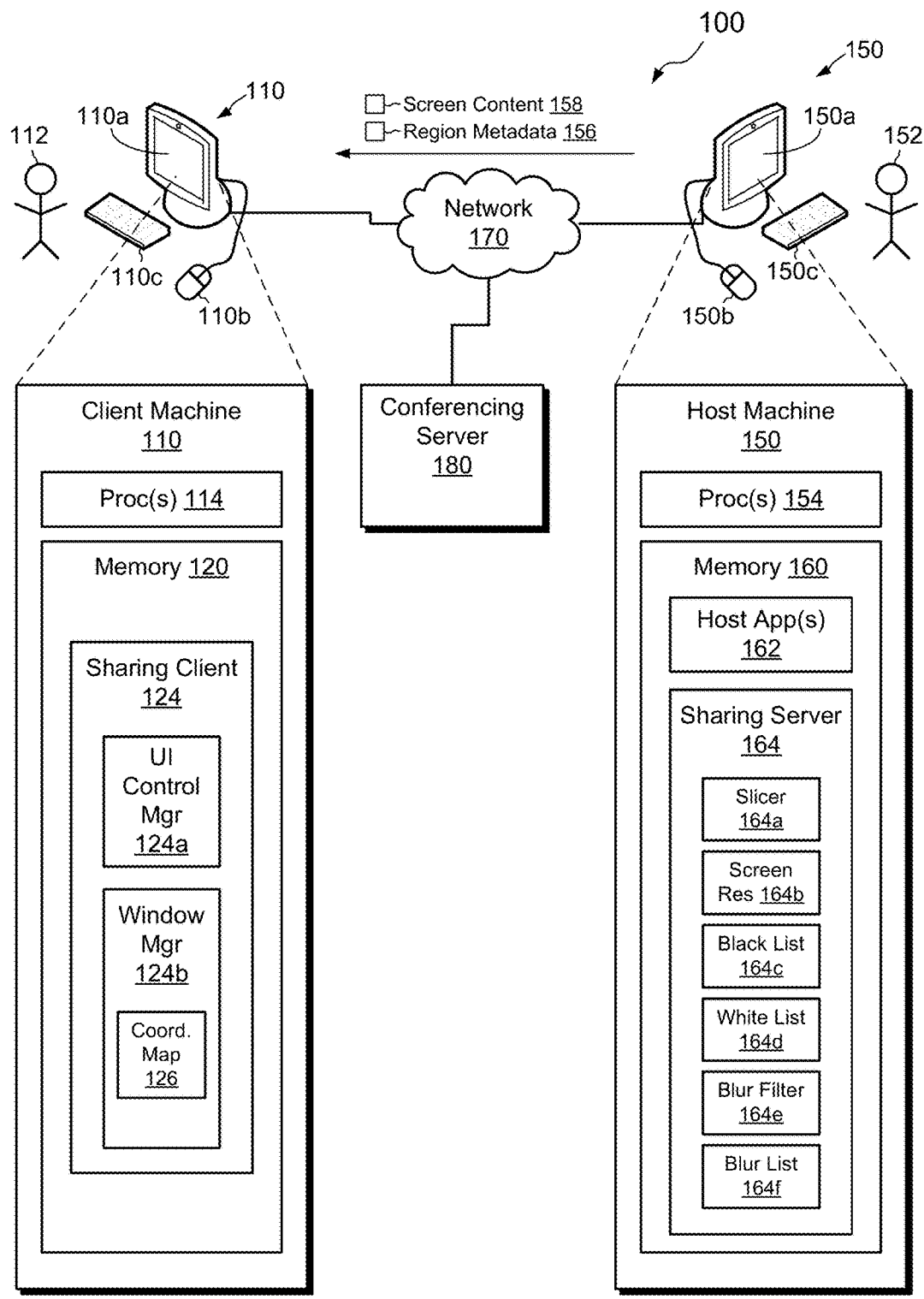
FIG. 1 is a block diagram of an example environment in which embodiments of the improved technique hereof can be practiced.

FIG. 1 shows an example environment 100 in which embodiments of the improved technique hereof can be practiced. Here, a client machine 110 connects to a host machine 150 over a network 170, such as the Internet, a WAN (wide area network), or a LAN (local area network). Optionally, a conferencing server 180 connects to the network 170, e.g., to support web conferencing between the client machine 110 and the host machine 150. In the example shown, the client machine 110 has a monitor 110a, a pointer device (e.g., a mouse, trackball, trackpad, touchpad, touchscreen, etc.) 110b, and a keyboard 110c, which may be implemented in hardware or software. Likewise, the host machine 150 has a monitor 150a, a pointer device 150b, and a keyboard 150c. The client machine 110 is operable by a user 112, and the host machine 150 is operable by a user 152. Although the client machine 110 and the host machine 150 are each shown with a single monitor, each may have greater than one monitor, and each monitor may take any suitable form (e.g., as a stand-alone monitor, integrated monitor, touchscreen, projector, or the like.

The client machine 110 and the host machine 150 may each take any suitable form. For example, each may be provided as a desktop computer, laptop computer, tablet computer, smart phone, PDA (personal data assistant) or the like, i.e., any computing machine capable of screen sharing. In addition, the client machine 110 and the host machine 150 need not be the same type of machine.

As further shown in FIG. 1, the client machine 110 includes a set of processors 114 and memory 120. The set of processors 114 includes one or more processing chips and/or assemblies. The memory 120 includes both volatile memory, e.g., Random Access Memory (RAM), and non-volatile memory, such as one or more ROMs (Read-Only Memories), disk drives, solid state drives, and the like. The set of processors 114 and the memory 120 together form control circuitry, which is constructed and arranged to carry out various methods and functions as described herein. Also, the memory 120 includes a variety of software constructs realized in the form of executable instructions. When the executable instructions are run by the set of processors 114, the set of processors 114 carry out the operations of the software constructs. Although certain software constructs are specifically shown and described, it is understood that the memory 120 typically includes many other software constructs, which are not shown, such as an operating system, various applications, processes, and daemons.

The memory 120 of the client machine 110 "includes," i.e., realizes by execution of software instructions, a sharing client 124. The sharing client 124 may be provided, for example, as a remote desktop client, a web conferencing program, or the like, which is constructed and arranged to render, on the monitor 110a, a desktop of the host machine 150, or a portion thereof, such as screen content for a particular application, document, or monitor of the host machine 150. The sharing client 124 includes a UI (user interface) control manager 124a and a window manager 124b. The UI control manager 124a is configured to provide UI elements to enable the user 112 to control the display of shared screen content received from the host machine 150, and the window manager 124b is configured to control the display of shared screen content in one or more windows, such as those supported by Microsoft Windows or Apple OS X (or any other window-based operating system or program). In some examples, the window manager 124b includes a coordinate map 126, which is configured to associate locations of screen content from the host machine 150 with corresponding screen content as displayed in windows on the client machine 110. Thus, the coordinate map 126 provides a common base between the shared screen content from the host and the rendering of that content in windows on the client.

The host machine 150 has its own set of processors 154 and memory 160, which may be provided as described above for the client machine 110 or in a different manner. The memory 160 also includes a variety of software constructs realized in the form of executable instructions which, when run by the set of processors 154, cause the host machine 150 to carry out the operations defined by the software constructs.

The memory 160 of the host machine 150 is seen to include one or more host applications 162 (e.g., any applications running on the host machine 150) and a sharing server 164, such as a remote desktop server or web conferencing program that supports screen sharing to a client. As shown, the sharing server 164 includes the following constructs:

- Slicer 164*a*: Configured to slice a frame or portion thereof of host screen content into multiple screen regions formed by image features in the frame or portion thereof. For example, the slicer 164*a* is configured to divide screen content from the host desktop into multiple rectangles and to send region metadata identifying locations and dimensions of the rectangles to the client machine 110, such that the client machine 110 is enabled to render the rectangles at corresponding screen locations on the client machine 110.
- Screen Resolution Setting 164*b*: A resolution setting of the monitor 150*a* (or of multiple such monitors) of the host machine 150.
- Black List 164*c*: A list of applications, folders, and/or web domains that are identified as non-shareable. According to some examples, the host machine 150 selectively blurs non-shareable screen content on the black list 164*c* prior to sending such screen content to the client machine 110, so that the non-shareable screen content is not readily observable when rendered on the client machine 110.
- White List 164*d*: A list of applications, folders, and/or web domains that are identified as shareable. According to some examples, the host machine 150 selectively blurs screen content corresponding to all screen elements except those on the white list 164*d* prior to sending screen content to the client machine 110, so that client machine 110 can only display elements on the white list 164*d* without blurring. Typically, only a black list 164*c* or a white list 164*d* is used at a time.
- Blur Filter 164*e*: A graphical filter configured to perform a blurring operation on specified graphical content, such as screen areas containing applications, folders, and/or web domains that appear on the black list 164*c* or that do not appear on the white list 164*d*.
- Blur List 164*f*: A table that associates applications, folders, and/or web domains with corresponding degrees of blurring to be applied to such content, allowing different types of content to be blurred to different degrees. For example, the blur list 164*f* may specify a lesser degree of blurring to a text editor than to a folder containing large, recognizable icons.

In example operation, the client machine 110 and the host machine 150 establish a screen-sharing session that enables the user 112 of the client machine 110 to view screen content of the host machine 150. For example, the client machine 110 runs the sharing client 124 as a remote-desktop client, to view and remotely control a desktop of the host machine 150, which runs the sharing server 164 as a remote-desktop server. Alternatively, the client machine 110 and the host machine 150 run the respective sharing client 124 and sharing server 164 as web conferencing applications or the like, in which the user 152 of the host machine 150 shares some or all of a desktop of the host machine 150 with the client machine 110.

As the host machine 150 generates frames of screen content to be shared (e.g., video frames of the desktop of host machine 150, the slicer 164 processes the screen content and generates multiple screen regions, such as rectangles or other shapes, based on features in the screen content. For example, the slicer 164 runs an edge-detection algorithm, such as a Hough transform, on the screen content to identify edges in the screen content, such as abrupt changes in color and/or brightness. The slicer 164*a* then generates rectangles based on the detected edges. In an example, the slicer 164*a* generates rectangles as non-overlapping regions within the screen content, such that no rectangle overlaps with any other rectangle.

There are multiple ways to construct rectangles from detected edges. In some examples, the slicer 164*a* generates rectangles in a context-sensitive manner, e.g., by applying information about the type of content being displayed. For instance, if the slicer 164*a* detects that the screen content shows a Microsoft Word document (e.g., based on an operating system call), the slicer 164*a* may apply a priori knowledge of the contents of Microsoft Word windows, such as the fact that they generally include a title bar, a menu bar, a set of toolbars, and a document display window. The slicer 164*a* may then generate rectangles to encompass the corresponding elements, e.g., one for the menu bar, one for the toolbars, etc. In some examples, the slicer 164*a* applies machine learning in generating the rectangular regions. For example, the user 152 and/or 112 may provide feedback to the slicer 164*a*, which indicates whether the slicer 164*a* has generated rectangles in a manner of which the user approves. The slicer 164*a* receives the feedback and adjusts coefficients of a machine learning module to reward approved selections and/or to punish disapproved selections. Over time, the machine learning module improves its selections and tends to place rectangles in a manner that accords with user preferences.

Once the slicer 164*a* has defined rectangles or other-shaped regions that divide the screen content to be shared, the host computer 110 generates region metadata 156 that identifies the locations and dimensions of the generated regions, e.g., using the same coordinate system as maintained by the coordinate map 126. The host machine 150 then sends the region metadata 156 to the client machine 110 along with associated screen content 158. For example, the host machine 150 sends the region metadata 156 as frame metadata in frames of screen content 158, e.g., one set of region metadata 156 for each video frame.

The client machine 110 receives the screen content 158 and region metadata 156, and the window manager 124*b* renders the screen content 158 in a first window on the client machine 110 (e.g., on the monitor 110*a* or on multiple such monitors). The window manager 124*b* also renders the rectangles (or other-shaped regions) specified in the region metadata 156. In some examples, the user 112 may display or hide the rectangles by operating a UI control.

With the rectangular or other-shaped regions displayed in the first window, the user 112 may select one or more of the regions, e.g., by operating another UI control and then clicking one or more of the regions. Once the user 112 selects one or more regions, the user 112 may drag the regions away from their original locations. In response to a user action to drag a selection of regions, the window manager 124*b* detects the user action and creates a second window for holding the selected regions. Preferably, the second window is sized to tightly surround the selected region or regions, i.e., to be no larger than necessary for holding the selected contents. The user 112 may then place the second window at any suitable location for easy viewing. The user 112 may also resize the second window as desired, e.g., making it larger where appropriate or smaller where appropriate.

In an example, the window manager 124*b* removes screen content from selected regions of the first window when creating the second window. Thus, the selected content may be regarded as being moved from the first window to the second window rather than being copied. In an example, the user 112 may create additional windows using the same actions as described above in connection with creating the second window.

Although this document uses familiar user-interface terms such as "click" and "drag," one should appreciate that user-interface technology may provide numerous ways of selecting and moving graphical elements besides clicking buttons and dragging by holding down a button while moving a pointer device. Thus, "clicking" may also be accomplished by tapping a touchscreen or by performing any other suitable selecting operation. Likewise, "dragging" may be accomplished by holding down a tapped selection and moving a finger, or by any other suitable means. Thus, the terms "click" and "drag" are intended as functional terms and are not limited to any particular user-interface technology.

Figure 2:
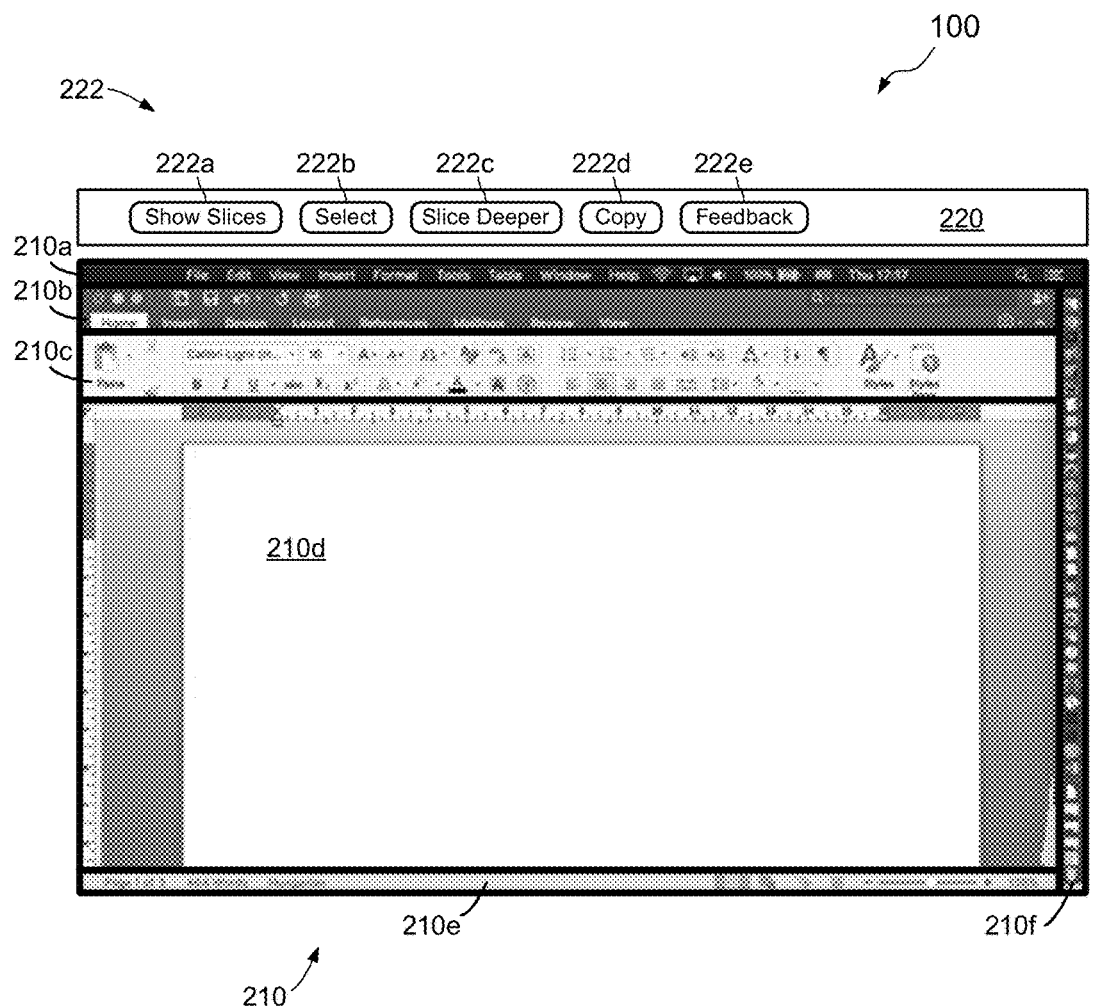
FIG. 2 is an example screen shot of screen content from a host machine as displayed on a client machine with particular screen regions highlighted.

FIG. 2 shows an example first window 210 as rendered by the window manager 124*b* on the client machine 110. In the example shown, the screen content within the first window 210 corresponds to an instance of a word processing program running on the host machine 150. For example, the user 112 may operate the word processing program using remote desktop (in which case there may be no separate user 152 of the host machine 150). Alternatively, the user 152 of the host machine 150 may share some or all of the host desktop as part of a web conference or other sharing session, and the user 112 of the client machine 110 may observe and in some cases control that content.

As further shown in FIG. 2, a UI region 220 includes multiple UI controls 222, generated by the UI control manager 124*a*, which enable the user 112 of the client machine 110 to interact with the shared screen content. For example, the UI controls 222 include the following:

Show Slices Button 222*a*: Toggles the display of screen regions (e.g., rectangles) on and off, allowing the user 112 to see available options for moving screen content into a second window (or additional window). Placement of screen regions is based upon region metadata 156 received from the host machine 150.

Select Button 222*b*: Clicking this button enables the user 112 to select one or more screen regions (e.g., any of regions 210*a*-210*f*) for placement in a second window or additional window. For example, the acts of clicking the select button 222*b* and then clicking and dragging a particular screen region causes the window manager 124*b* to create a new window and to move the selected screen content from the first window 210 into the new window.

Slice Deeper Button 222*c*: Clicking this button causes a selected region (or all regions) to be sliced into smaller sub-regions. For example, selecting region 210*c* (toolbars) and then clicking the slice deeper button 222*c* may slice the region 210*c* into multiple sub-regions, which may each contain one group of toolbars, for example. Slice-deeper functionality can be applied multiple times. For instance, clicking the button 222*c* a third time may cause a sub-region containing a single group of toolbars to be sliced into multiple even smaller sub-regions, each containing a single toolbar button, for example.

Copy Button 222*d*: Clicking this button allows the user 112 to make a freeform selection of screen content to be copied to a new window. Copy functionality is described at a later point in this document.

Feedback Button 222*e*: Clicking this button opens a feedback screen, which enables the user 112 to approve or disapprove of the manner in which the slicer 164*a* has rendered the screen regions (e.g., 210*a*-210*f*). In an example, the sharing client 124 collects entered feedback and sends it to host machine 150, where the slicer 164*a* applies the feedback in training the machine-learning module.

Figure 3:
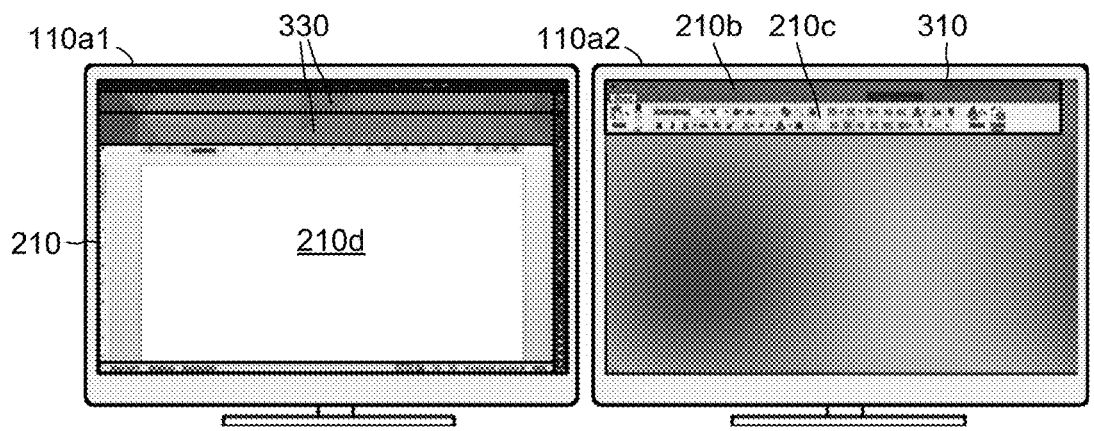
FIG. 3 is a front view of left and right monitors of the client machine, where a screen region from the left monitor has been moved to the right monitor.

FIG. 3 shows an example result of the window manager 124*b* creating a second window 310. In this case, the user 112 has selected regions 210*b* and 210*c* from the first window 210 (FIG. 2), e.g., by clicking the select button 222*b* and clicking the regions 210*b* and 210*c*, and has dragged the selected regions to trigger creation of the second window 310. In this case, the client machine 110 has two monitors, 110*a*1 and 110*a*2, and the user 112 has dragged the selected regions 210*b* and 210*c* from the monitor 110*a*1 to the monitor 110*a*2. In the example shown, movement of the screen regions 210*b* and 210*c* leaves empty regions 330 in the original screen-region locations.

In an example, the second window 310 is a fully-functional and interactive window. For instance, when performing screen sharing pursuant to remote desktop control, or pursuant to web conferencing when the client machine 110 has control over a remote application, any content displayed within the second window is interactive. For example, if the second window 310 displays UI controls of an application 162 running on the host machine 150 (FIG. 1), then the UI controls activate when the user 112 clicks them in the second window 310, just as they would in a normal remote-desktop arrangement or when running the application 162 locally.

Figure 4A:
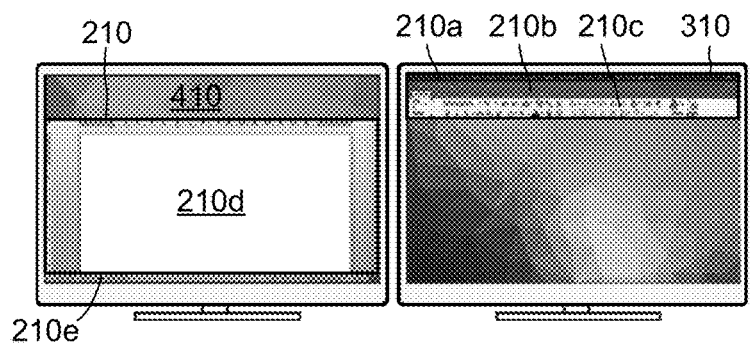
FIGS. 4a and 4b are front views of the pair of monitors of the client machine, which show an example sequence for changing a screen resolution on the host machine to enlarge a view on the client machine, once additional vertical space has become available on the client machine.
Figure 4B:
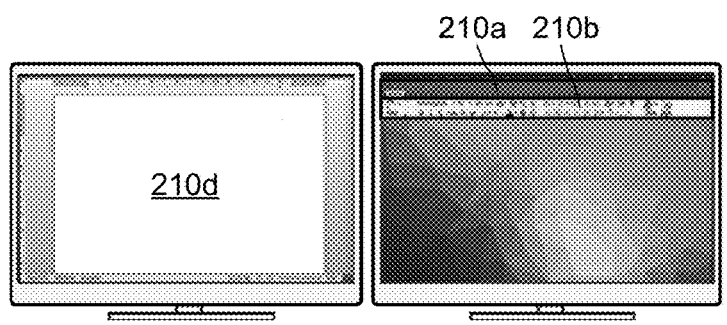

FIGS. 4*a* and 4*b* show an example sequence for automatically enlarging screen content after creating empty vertical space 410 in the first window 210. As shown in FIG. 4*a*, regions 210*a*, 210*b*, and 210*c* have been moved to the second window 310, leaving empty vertical space 410 above the first window 210, which has shrunken to minimally enclose the remaining regions (here, 210*d* and 210*e*). In an example, upon detecting that the user's movement of regions 210*a*, 210*b*, and 210*c* created empty vertical space 410, the window manager 124*b* prompts the user 112 to enlarge the first window 210, e.g., by displaying a pop-up box asking the user 112 to proceed. If the user 112 agrees, the client machine 110 sends a message to the host machine 150 that directs the host machine 150 to change its screen resolution 164*b* (FIG. 1) to a lower value, such that screen content 158 appears larger. The result is shown in FIG. 4*b*, where the first window 210 is enlarged to fill the available vertical space.

Figure 5:
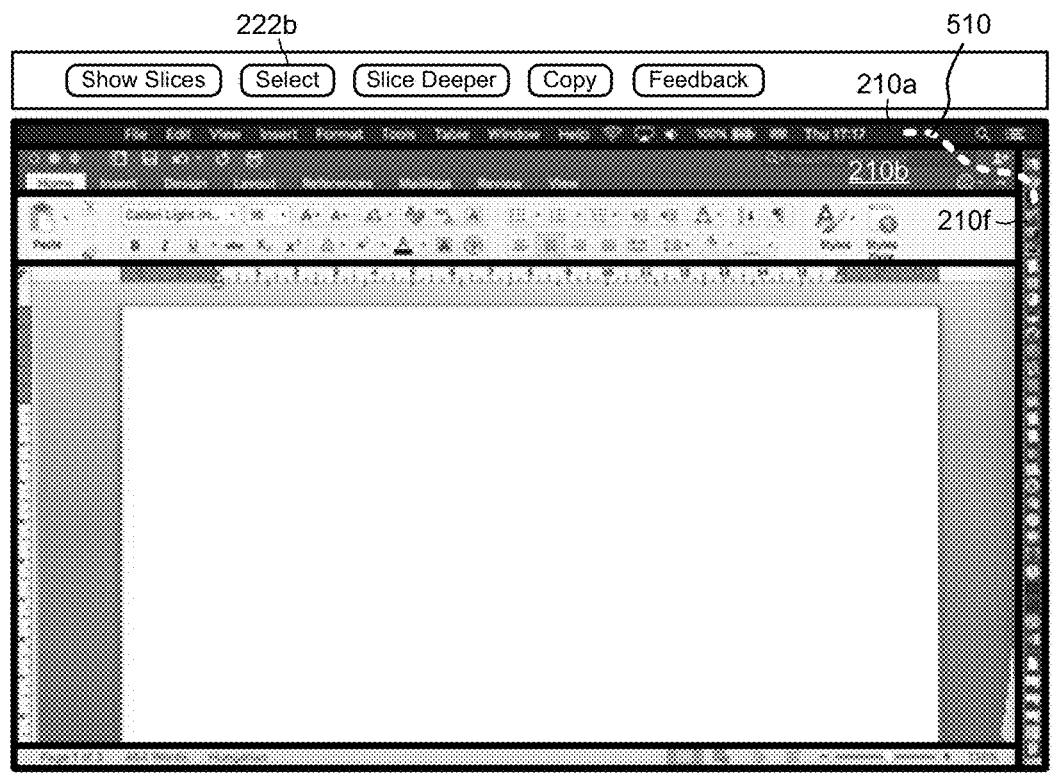
FIG. 5 is a screen shot that shows an example selection of multiple screen regions to be moved to a different screen area on the client machine.

FIG. 5 shows an example arrangement for selecting multiple screen regions at a time. As described above, the user 112 may click the select button 222*b* and then click one or more screen regions (e.g., any of 210*a*-210*f*) in sequence. Alternatively, as shown in FIG. 4, the user 112 may click the select button 222*b* and then draw a line 510 that intersects one or more screen regions. Each intersected screen region becomes part of the user's selection. In the example shown, the user 112 has selected screen regions 210*a*, 210*b*, and 210*f*. The user 112 may then drag the group selection to create a new window and move the contents of selected screen regions 210*a*, 210*b*, and 210*f* to the new window.

Figure 6A:
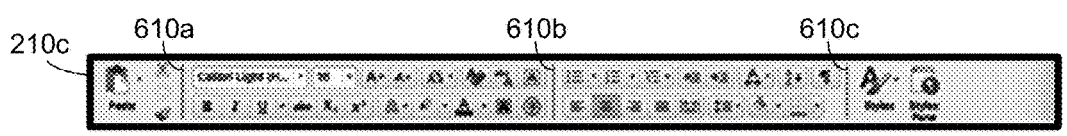
FIGS. 6a and 6b are different views of an example screen region of FIG. 1 and show a sequence for slicing the screen region into smaller sub-regions.
Figure 6B:

FIGS. 6*a* and 6*b* show an example arrangement for implementing a slice-deeper function, such as the one described in connection with UI control 222*c* in FIG. 2. As shown in FIG. 6*a*, the screen region 210*c* includes multiple groups of toolbars and other elements that are separated by faint vertical lines 610*a*, 610*b*, and 610*c*. In an example, the user 112 selects screen region 210*c* and clicks the slice deeper button 222*c*. As a result, as shown in FIG. 6*b*, the screen region 210*c* is itself divided into sub-regions 620*a*, 620*b*, 620*c*, and 620*d*. In an example, the behavior of sub-regions 620*a*-620*d* is the same as the behavior described above for the screen regions 210*a*-210*f*. For example, the user 112 may select one or more of the sub-regions 620*a*-620*d* and create a second window 320 that contains them.

In an example, the window manager 124*b* in the client machine 110 coordinates with the slicer 164*a* in the host machine 150 to implement the slice-deeper functionality. For example, when the user 112 clicks the slice deeper button 222*c*, the window manager 124*b* sends a message to the host machine 150. The message identifies the screen region or regions to be further sliced (e.g., region 210*c* in this case). In response, the slicer 164*a* performs a slicing operation on the identified region or regions, e.g., using any of the above-described methods for performing initial slicing, and sends back updated region metadata 156 that specifies the locations and dimensions of the finer-granularity sub-regions.

Figure 7:
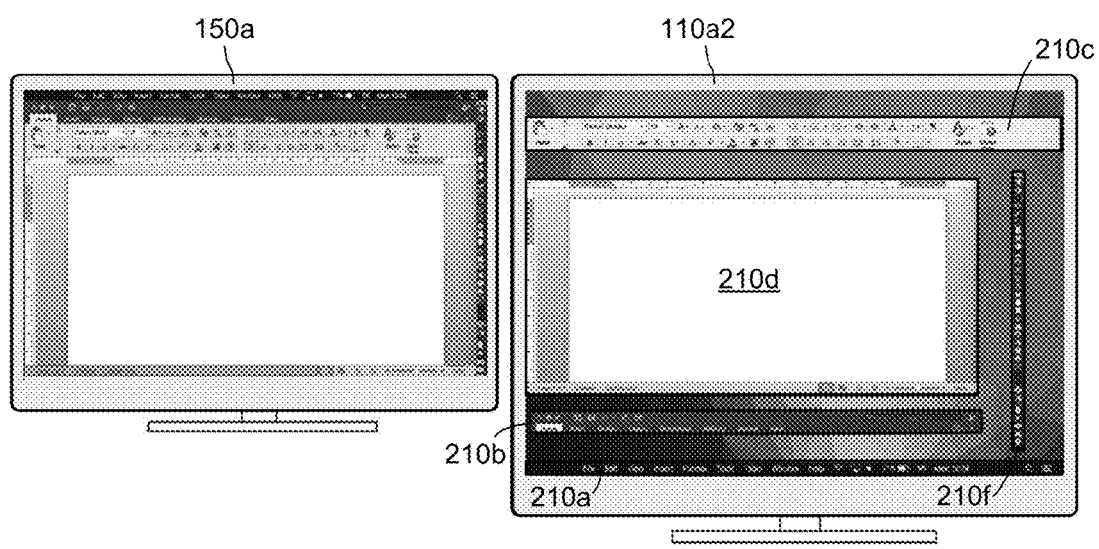
FIG. 7 is a comparison front view of a monitor of the host machine (left) and a corresponding front view of a monitor of the client machine (right), which shows different screen portions of the same host screen moved to different screen areas and resized.

FIG. 7 shows an example arrangement for rendering multiple screen regions in multiple respective windows. Here, the monitor shown to the left is the monitor 150*a* of the host machine 150 and the monitor shown to the right is a monitor of the client machine 110, such as the monitor 110*a*2. The two monitors 150*a* and 110*a*2 show corresponding views of the same screen content, but the screen content shown on the client monitor 110*a*2 shows different screen regions in respective windows, which were each created from the first window 210 (FIG. 2) using the technique described above. One should appreciate that the user 112 may place each of the windows displayed on monitor 110*a*2 in any screen location and resize the windows independently as desired. For example, the window containing region 210*c* (toolbars) may be enlarged for easier access and placed wherever it can be conveniently accessed.

Figure 8:
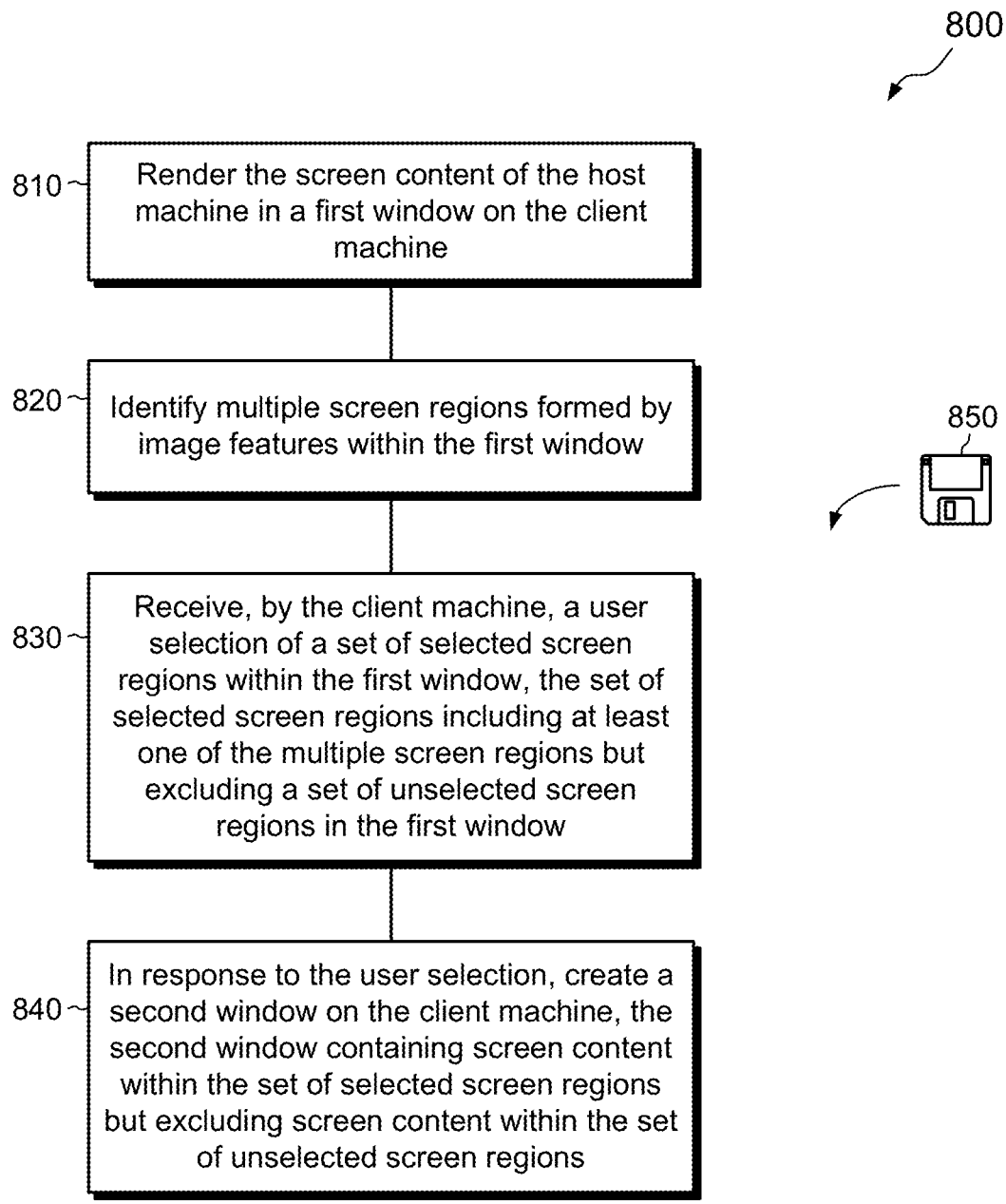
FIG. 8 is a flowchart showing an example method of manipulating shared screen content.

FIG. 8 shows an example method 800 that may be carried out in connection with the environment 100 and provides a summary of some of the features described so far. The method 800 is typically performed, for example, by the software constructs described in connection with FIG. 1, which reside in the memory 120 and/or 160 of the client machine 110 and/or the host machine 150, respectively, and may be run by the set of processors 114 and/or 154. The various acts of method 800 may be ordered in any suitable way. Accordingly, embodiments may be constructed in which acts are performed in orders different from that illustrated, which may include performing some acts simultaneously.

At 810, screen content 158 of the host machine 150 is rendered in a first window 210 on the client machine 110. The client machine 110 may render such content in the context of remote desktop operations, web conferencing, or the like.

At 820, multiple screen regions formed by image features within the first window 210 are identified. For example, the client machine 110 may render screen regions 210*a*-210*f* in respective rectangles that are visible to the user 112 (see FIG. 2). In an example, the slicer 164*a* running on the host machine 150 defines the screen regions and provides the client machine 110 with region metadata 156 that contains information about their locations and dimensions. The client machine 110 processes the region metadata 156 and renders the rectangles in the manner shown.

At 830, the client machine 110 receives a user selection of a set of selected screen regions within the first window 210. The set of selected screen regions selected by the user includes at least one of the multiple screen regions but excludes a set of unselected screen regions in the first window 210, i.e., screen regions that the user 112 has not selected.

At 840, in response to the user selection, the client machine 110 creates a second window 310. The second window 310 (FIG. 3) contains screen content within the set of selected screen regions but excludes screen content within the set of unselected screen regions.

By allowing different portions of host screen content to be displayed in respective locations on the client machine 110, the improved technique enhances user experience and productivity.

Further improved techniques will now be described, which allow the user 112 of the client machine 110 to create copies of shared screen content in a freeform manner. Such techniques include receiving a user action of drawing a shape in a window that displays shared screen content from the host machine 150. In response to the user action, the client machine 110 creates a new window and displays the contents of the drawn shape in the new window. In an example, the client machine 110 may create any number of copies of screen contents with each copy rendered in its own window, which the user 112 may place and resize as desired.

Figure 9:
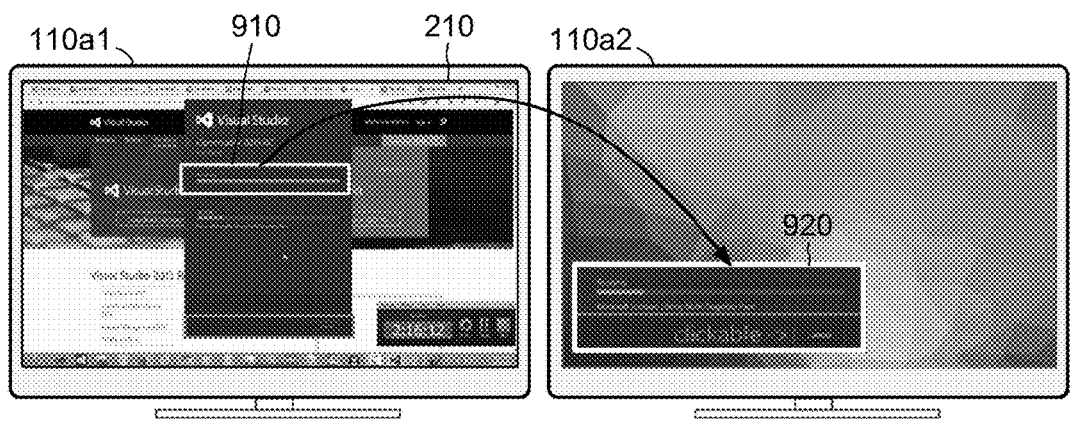
FIG. 9 is a front view of left and right monitors of the client machine and shows an example copy operation of a user-drawn region of screen content from the left monitor to the right monitor.

FIG. 9 shows an example arrangement for enabling freeform copying of shared screen content. In this example, the client machine 110 has two monitors 110*a*1 and 110*a*2, with the host desktop (or portion thereof) rendered in the first window 210 of monitor 110*a*1. To copy a desired portion of the first window 210, the user 112 clicks the copy button 222*d* (FIG. 2) and uses a mouse or other pointer device 110*b* to draw a closed shape 910, such as a rectangle, circle, ellipse, etc., around a desired portion of the first window 210. In response to the user 112 drawing the closed shape 910, the window manager 124*b* creates a new window 920 that includes the same screen content shown within the drawn shape 910. The user 112 may then place the new window 920 at any desired screen location, such as on the monitor 110*a*2 (as shown), and may resize the window 920 as desired, e.g., by making it bigger. Preferably, the second window 920 contains a copy of the screen content in the closed shape 910; thus, both copies remain. As corresponding screen content on the host machine 150 changes, e.g., as the status bar shown in the windows 210 and 920 progresses, the window manager 124*b* updates screen content in both windows 210 and 920. In some cases, the user 112 may minimize the window 210 and continue viewing only the window 920, e.g., if the window 920 contains the only interesting features.

As is the case with moved screen content, copied screen content may also be fully interactive. For example, clicking the "Cancel" button in window 920 has the same effect as clicking the same button in window 210. In an example, the coordinate map 124c (FIG. 1) maintains associations between corresponding screen content across different windows. For example, the coordinate map 124c maps each pixel in the second window 920 to a corresponding pixel in the first window 910 and to a corresponding pixel in the shared screen content 158 from the host machine 150. In this manner, windows of any number containing the same content are kept in sync.

Figure 10:
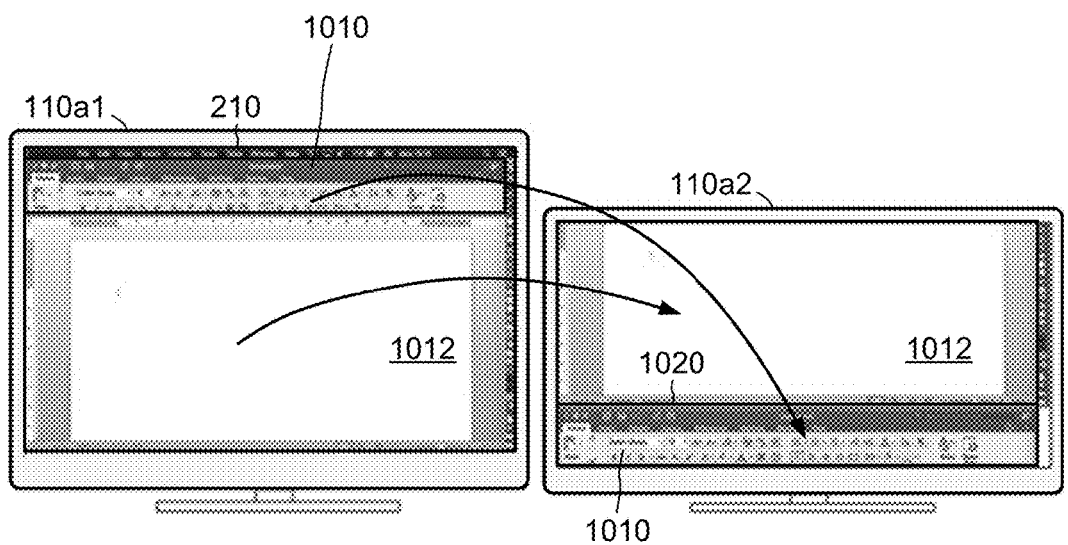
FIG. 10 is a front view of left and right monitors on the client machine and shows another example copy operation of screen content from the left monitor to the right monitor, the copy operation in this case being of a toolbar that would otherwise be off-screen on the right monitor.

FIG. 10 shows another copying example. Here, the user 112 has drawn a rectangle around the menu bar and toolbars of a word processing application and has copied them to a new window 1020 on monitor 110a2. The user 112 has also performed similar acts to copy text region 1012 from monitor 110a1 to monitor 110a2. The monitor 110a2 thus shows the toolbars below the text instead of in the usual location above the text. The arrangement shown on the monitor 110a2 may be easier to operate than the one on the monitor 110a1 when working on areas near the bottom of a page. For example, the toolbars in their usual location may have scrolled off-screen, meaning that the user 112 would need to scroll up and down to access both the text and the toolbars needed to adjust the text. By copying the toolbars to an area below the text, such scrolling is avoided, as the copy of the toolbars is adjacent to the text being edited. In some cases, the user 112 may wish to create copies of toolbars or other controls even if no scrolling is needed, e.g., to avoid large pointer movements.

Figure 11:
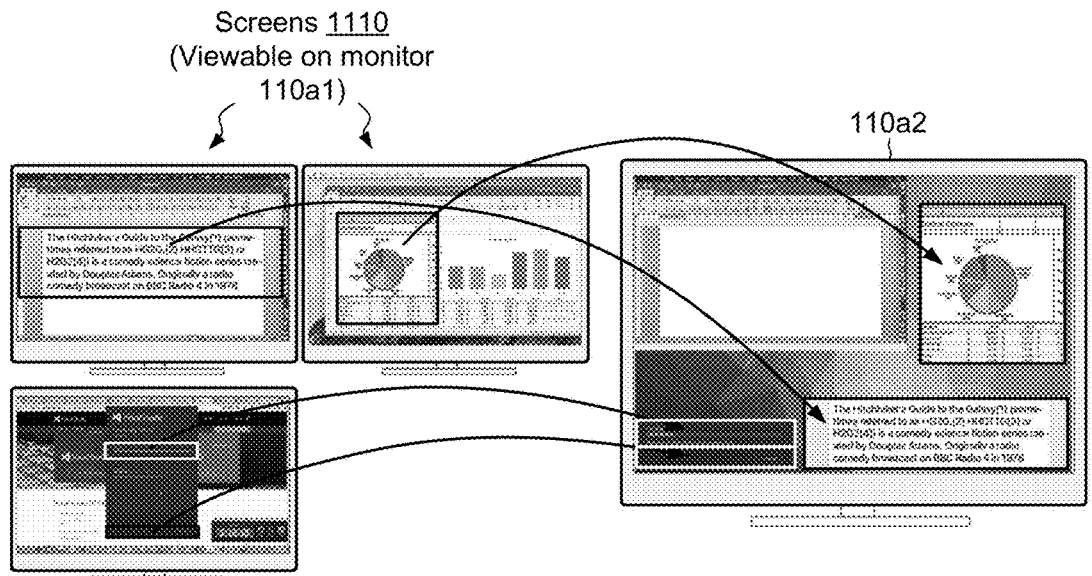
FIG. 11 is a front view of two monitors of the client machine, in which multiple small areas of screen content of different remote-desktop screens on the first monitor are copied to a second monitor, where they all appear together on the second monitor.

FIG. 11 shows yet another copying example. Here, the user 112 controls multiple remote screens 1110 on monitor 110a1, e.g., by establishing multiple simultaneous remote desktop sessions. Rather than having to switch between screens to view desired content on each screen, the user 112 may instead copy desired portions of each screen 1110 to a free desktop area, such as on monitor 110a2. The user 112 is thus able to view and interact with multiple screens via windows containing copied content, aggregating information and avoiding the need to switch between screens. The user 112 may also place and resize screen content in any desired manner.

Although the copying examples above may clearly apply to remote desktop applications, they also apply to web conferencing applications and the like. For example, the user 152 of the host machine 150 may point a webcam at a whiteboard and work on the whiteboard during a web conference. As this occurs, the user 112 of the client machine 110 may wish to zoom in on the whiteboard to see more easily what the user 152 is drawing. To this end, the user 112 may draw a closed shape around the image of the whiteboard and create a copy of the whiteboard content in a new window. The user 112 may then enlarge the new window to see the whiteboard markings more easily.

In some situations, copied screen content corresponds to an application 162 that does not have focus on the host machine 150, meaning that it is not the currently active application on the host machine 150. In such cases, clicking on a button or other control in a window containing copied screen content might yield unpredictable results, as clicking a button of an application 162 that is in focus executes the button-click directly, whereas clicking a button of an application 162 that is out of focus causes the application to get focus on the host machine 150, but not to execute the button click. Rather, a second click to the same control is required to execute the button click. To address this inconsistency, the window manager 124b, upon receiving a single-click by the user 112 on a UI control in a copied window, checks whether the corresponding application 162 is in focus on the host machine 150. If so, the window manager 124b transmits the single click to the host machine 150, i.e., to directly execute the action associated with a click of the UI control. However, if the window manager 124b determines that the host application 162 receiving the single-click is not in focus, the window manager 124b directs the host machine 150 to give focus to the host application 162 focus and then to transmit the single-click to the UI control, causing the host machine 150 to execute the action associated with a click of the UI control. In this fashion, the user 112 need not be concerned with whether the host application 162 is in focus or not, and single-clicks to UI controls in copied windows behave consistently.

In some situations, the screen contents in a copied window may disappear or change in a significant way. For example, the host application 162 from which screen contents have been copied may become minimized on the host machine 150 or may become covered by another window, e.g., a window of another host application. In such cases, the screen contents in a copied window may disappear or change to that of desktop wallpaper or another application. In an example, the window manager 124b detects changes in window content and takes action to avoid user confusion, such as by hiding the window, graying out the window, or rendering the window in some other recognizably altered way, such as partially transparently. In some examples, the window manager 124b monitors the screen contents of the copied windows and restores them to their normal visible condition when the screen content returns to normal. In some examples, the window manager 124 communicates with the host machine 150 to identify the displayed windows and their corresponding applications, which may be obtained by making operating-system calls on the host machine 150. The window manager 124b then applies application information from the host machine 150 in determining whether hiding or altering a copied window is warranted. For example, content of some copied windows may change normally in the course of an application's use. The window manager 124b may thus apply application information in distinguishing content that changes normally from content that changes as a result of host applications being minimized, occluded by other content, and so forth. The window manager 124b may then take appropriate action with regard to the changed screen content.

Figure 12:
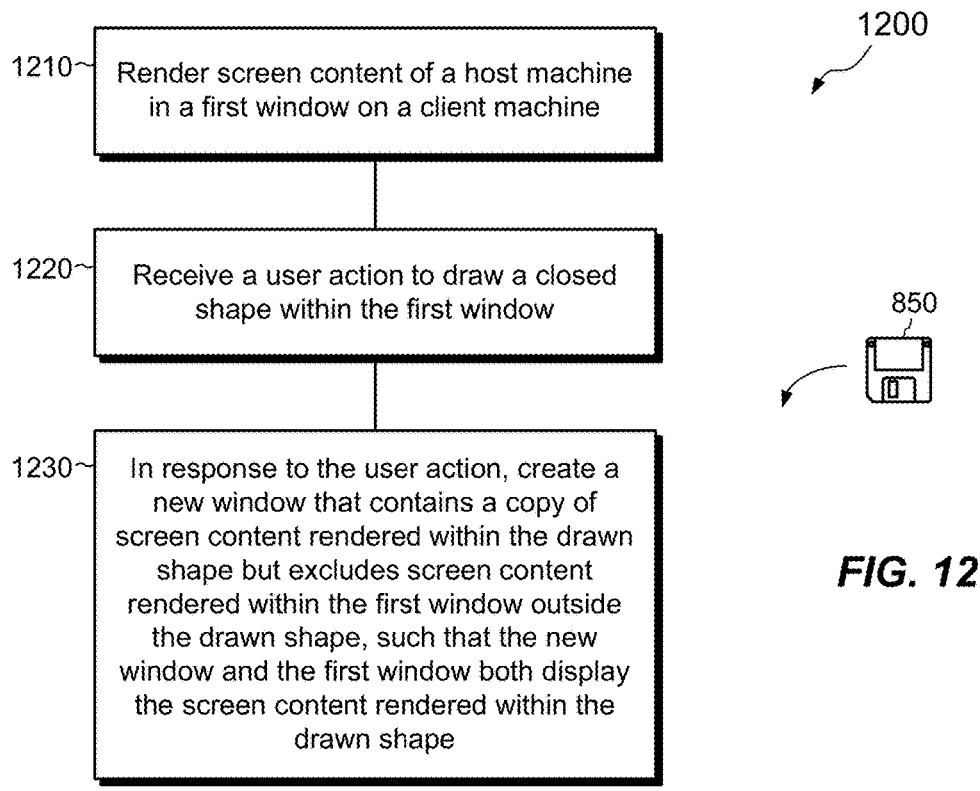
FIG. 12 is a flowchart showing an example method of copying screen content of a shared screen.

FIG. 12 shows an example method 1200 that may be carried out in connection with the environment 100 and provides a summary of some of the copying features described above.

At 1210, the client machine 110 renders screen content of the host machine 150 in a first window 210 on the client machine 110. As before, the client machine 110 may render such content in the context of remote desktop operations, web conferencing, or the like.

At 1220, the client machine 110 receives a user action to draw a closed shape, such as the rectangle 910 (FIG. 9) within the first window 210. For example, the user 112 may click the copy button 222d and proceed to draw the closed shape. Alternatively, copying may be initiated in any suitable way.

At 1230, in response to the user action (e.g., clicking the copy button 222d and drawing the closed shape), the client machine 110 creates a new window (e.g., 920) that contains a copy of screen content rendered within the drawn shape (e.g., 910) but excludes screen content rendered within the first window 210 outside the drawn shape 910 (such as the rest of the screen content in window 210). In this manner, the new window 920 and the first window 210 both display the screen content rendered within the drawn shape 910.

Further improved techniques will now be described that allow the user 152 of the host machine 150 to prevent private or other non-shareable screen content on the host machine 150 from being displayed on the client machine 110 when performing screen sharing from the host machine 150 to the client machine 110. Such techniques involve identifying, by the host machine 150, non-shareable elements in the screen content of the host machine 150 and, prior to sending the screen content of the host machine 150 to the client machine 110 for rendering by the client machine 110, selectively blurring the non-shareable elements, such that the client machine 110 receives the screen content of the host machine 150 with the non-shareable screen elements already blurred.

Users of screen sharing software may find themselves in a position of needing to share their screens or portions thereof with other participants. A user may share a screen with little thought to the contents of open applications, folders, or websites, which might contain private information or simply information that the user does not wish to share. Also, most operating systems support notifications, i.e., messages that appear on a user's screen without warning. Certain messages might be private or even embarrassing. However, current screen-sharing solutions fail to provide suitable measures for protecting users from disclosure of private or other non-shareable content. Example techniques provided herein address this need by selectively blurring screen content of applications, folders, web domains, and/or notifications based on a black list 164c or a white list 164d (FIG. 1).

For example, the sharing server 164 on the host machine 150 automatically applies the blur filter 164e to screen content corresponding to elements on the black list 164c. Alternatively, the sharing server 164 automatically applies the blur filter 164e to all screen content except for screen content corresponding to elements on the white list 164d. One should appreciate that the sharing server 164 applies the blur filter 164e to outgoing screen content 158 (FIG. 1) and preferably not to screen content displayed locally on the host machine 150.

To selectively blur screen content corresponding to host applications 162, the sharing server 164 makes one or more calls into the operating system on the host machine 150 to identify all running applications, as well as their locations, dimensions, stacking orders, and focus state (in focus or not). The sharing server 164 then compares the list of running applications with those on the black list 164c or on the white list 164d to identify a set of non-shareable applications, i.e., those that are running on the host machine 150 and are either (i) on the black list 164c or (ii) not on the white list 164d. If a non-shareable application is in focus, the sharing server 164 applies the blur filter 164e to the entire application window of the non-shareable application (as the application in focus should always appear in the foreground). If a non-shareable application is not in focus, the sharing server 164 identifies which parts, if any, of the non-shareable application is visible, e.g., by identifying the area of the non-shareable application's window and subtracting screen content of every other application window stacked above it in the stacking order. The sharing server 164 then applies the blur filter 164e to the remaining screen area in the non-shareable application's window (but not to shareable content that blocks parts of the non-shareable application's window).

Blurring of folders may work in a similar way. For example, anytime the host machine 150 displays a folder, e.g., in Windows Explorer on a Windows machine or in Finder on a Mac, the sharing server 164 gets the current folder from the operating system and checks whether the current folder is listed on the black list 164c or on the white list 164d. The sharing server 164 then proceeds accordingly, by blurring visible portions of the folder window if it is non-shareable and by displaying it without blurring otherwise.

For websites, the sharing server 164 calls the operating system to obtain the URL (uniform resource locator) of any web page displayed in a running web browser on the host machine 150. The sharing server 164 checks whether the domain of the website is listed on the black list 164c or the white list 164d. The sharing server 164 then proceeds as before, blurring visible portions of the browser window if the domain is non-shareable and displaying the browser window without blurring otherwise.

For notifications, the sharing server 164 identifies a notification area on the desktop of the host machine 150. On a Windows machine, the notification area is typically in the lower-left corner of the main display. On a Mac, the notification area is typically in the upper-left corner. In some examples, the sharing server 164 applies the blur filter 164e to the entire notification area, such that any notifications appearing in the notification area become blurred. In other examples, the sharing server 164 detects that a notification is being issued, e.g., by polling the operating system, subscribing to and receiving an alert from the operating system, and/or detecting a change in screen content in the notification area. In an example, the sharing server 164 then queries the operating system to identify a host application 162 associated with the newly arriving notification. The sharing server 164 compares the identified host application with the black list 164c or the white list 164d. If the host application is non-shareable, the sharing server 164 applies the blur filter 164e to the notification area. Otherwise, the sharing server 164 may allow the notification to be displayed without blurring.

In some examples, the blur filter 164e may apply different blurring settings to different content, with blurring settings defined in the blur list 164f (FIG. 1). For example, applications, websites, and folders that contain large, easily recognizable features may have higher blur settings than applications, websites, and folders that contain only small text.

Figure 13:
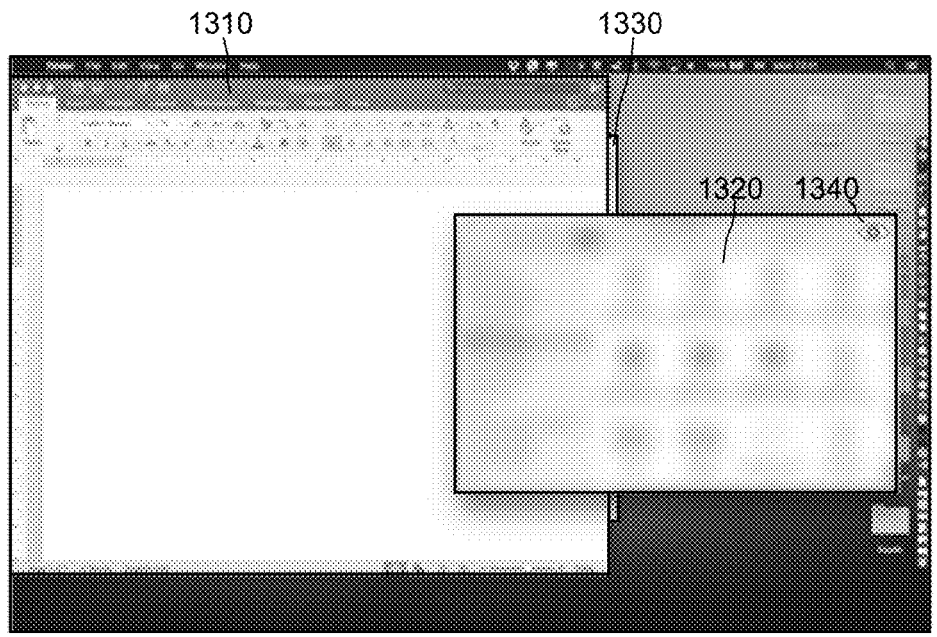
FIG. 13 is a screen shot showing an example blurring operation, in which screen content of the host machine is selectively blurred prior to being sent to the client machine.

FIG. 13 shows an example of selectively blurred screen content as viewed on the client machine 110. Three application windows 1310, 1320, and 1330 are seen to be open. In the illustrated example, application windows 1310 and 1330 are shareable (e.g., not on the black list 164c or on the white list 164d), and application window 1320 is non-shareable. Accordingly, application window 1320 is blurred whereas application windows 1310 and 1330 appear without blurring. If application window 1310 were to be stacked on top of application window 1320 (instead of behind it, as shown), then none of application window 1310 would be blurred and only the visible portion of application window 1320 would be blurred.

In an example, the blurred application window 1320 includes a UI control 1340, which a user may click to direct the sharing server 164 to unblur the application window 1320. In an example, only the user of the host machine 150 is allowed to operate the UI control 1340 to unblur the application window 1320.

Figure 14:
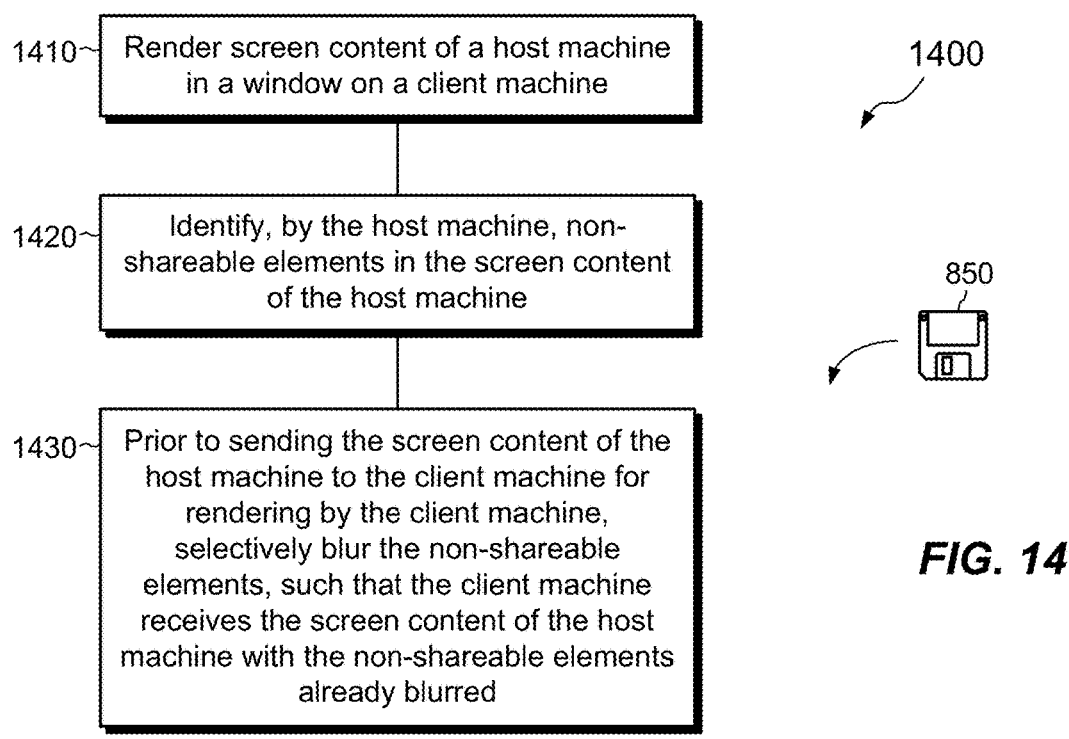
FIG. 14 is a flow chart showing an example method of selectively blurring shared screen content.

FIG. 14 shows an example method 1400 that may be carried out in connection with the environment 100 and provides a summary of some of the blurring features described above.

At 1410, the client machine 110 renders screen content of the host machine 150 in a window of the client machine 110, such as a window that shows a remote desktop or screen content being shared over a web conferencing or similar application.

At 1420, the host machine 150 identifies non-shareable elements in the screen content of the host machine 150, such as applications, websites, and folders appearing on the black list 164c (or not appearing on the white list 164d).

At 1430, prior to sending the screen content of the host machine 150 to the client machine 110 for rendering by the client machine 110, the host machine 150 selectively blurs the non-shareable elements, such that the client machine receives the screen content of the host machine with the non-shareable elements already blurred.

Having described certain embodiments, numerous alternative embodiments or variations can be made. For example, although embodiments have been described between a single host machine 150 and a single client machine 110, this is merely an example, as some embodiments may include multiple client machines 110. Also, machines may be configured to act as both clients and hosts, such that machines that operate as clients at one time may operate as hosts at another time, and vice-versa.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 850 in FIGS. 8, 12, and 14). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of displaying screen content of a host machine on a client machine, the method comprising:
rendering the screen content of the host machine in a first window on the client machine;
identifying multiple screen regions formed by image features within the first window;
receiving, by the client machine, a user selection of a set of selected screen regions within the first window, the set of selected screen regions including at least one of the multiple screen regions but excluding a set of unselected screen regions in the first window; and
in response to the user selection, creating a second window on the client machine, the second window containing screen content within the set of selected screen regions but excluding screen content within the set of unselected screen regions.

2. The method of claim 1, further comprising;
placing the second window at a screen location of the client machine as prescribed by a user of the client machine; and
resizing the second window in response to a user action to resize the second window.

3. The method of claim 2, further comprising mapping pointer locations within the second window to a shared coordinate system shared among the first window, the second window, and the host machine, such that pointer locations within both the first window and the second window are mapped to corresponding locations relative to the screen content of the host machine.

4. The method of claim 3, further comprising:
receiving, by the client machine, a set of UI (user input) actions performed within the second window; and
translating the set of UI actions performed within the second window to actions performed at corresponding screen locations on the host machine.

5. The method of claim 2, further comprising:
receiving a user command to sub-divide at least one region into smaller sub-regions;
receiving, by the client machine, a user selection of a set of the sub-regions; and
in response to the user selection, creating a new window on the client machine that contains screen content within the set of sub-regions but excludes content within unselected sub-regions.

6. The method of claim 2, further comprising removing the set of selected screen regions selected by the user operation from the first window, such that the first window no longer displays the set of selected screen regions.

7. The method of claim 6, wherein the user selection of the set of selected screen regions includes a vertical section of the first window, such that the first window becomes shorter as a result of creating the second window, and wherein the method further comprises, in response to the first window becoming shorter:
directing the host machine to change a screen resolution to magnify the screen content of the host machine, such that the screen content rendered in the first window of the client machine becomes larger.

8. The method of claim 2, wherein identifying the multiple screen regions formed by image features within the first window includes highlighting the screen regions in the first window on the client machine, and wherein the method further comprises:
defining the screen regions by performing image-processing operations on a frame of the screen content of the host machine, the image processing operations identifying edges within the screen content and constructing the screen regions as rectangles from at least some of the identified edges.

9. The method of claim 8, wherein constructing the screen regions based on the identified edges includes operating a machine-learning procedure to select rectangular shapes based on the identified edges as well as on prior training to define screen regions as rectangles based on user preferences.

10. The method of claim 8, wherein constructing the screen regions is performed by the host machine, and wherein the method further comprises:
generating, by the host machine, metadata that identifies a location and dimensions of each of the screen regions; and
sending the metadata to the client machine, the client machine thereby identifying the screen regions based on the metadata.

11. The method of claim 2, wherein the host machine and the client machine are a single machine, such that a locally running software application running on the single machine is displayed in both the first window and the second window.

12. The method of claim 2, further comprising:
in response to a user action to draw a closed shape within the first window, creating a third window that contains a copy of screen content rendered within the drawn shape but excludes screen content rendered within the first window outside the drawn shape, such that the third window and the first window both display the screen content rendered within the drawn shape.

13. The method of claim 12, wherein the third window includes screen content of a host application running on the host machine, wherein the host application does not have focus on the host machine, and wherein the method further comprises, in response to the user performing a single click operation in the third window on a UI (user interface) control of the host application displayed within the third window, (i) directing the host machine to provide focus to the host application on the host machine and (ii) executing an action that the host application associates with clicking the UI control.

14. The method of claim 12, further comprising placing the third window at a second screen location of the client machine as prescribed by the user and resizing the third window.

15. The method of claim 14, further comprising,
in response to the screen content displayed in the third window becoming hidden from view on the host machine, altering a visual appearance of the third window on the client machine by at least one of (i) hiding the third window or (ii) rendering the hidden screen content in the third window as grayed or partially transparent; and
in response to the screen content displayed in the third window becoming visible again on the host machine, restoring the visual appearance of the third window on the client machine.

16. The method of claim 2, further comprising:
identifying, by the host machine, non-shareable elements in the screen content of the host machine; and
prior to sending the screen content of the host machine to the client machine for rendering by the client machine, selectively blurring the non-shareable elements, such that the client machine receives the screen content of the host machine with the non-shareable elements already blurred.

17. The method of claim 16, wherein identifying the non-shareable elements includes:
identifying a set of applications running on the host machine;
comparing the set of applications with a list of blocked applications or a list of allowed applications to identify a set of non-shareable running applications; and
for each of the set of non-shareable running applications, applying a blurring filter to a screen area occupied by the non-shareable running application.

18. The method of claim 16, wherein identifying the non-shareable elements includes:
identifying a URL (Uniform Resource Locator) of a web page displayed by a web browser running on the host machine;
comparing a domain of the URL with one of a list of blocked domains or a list of allowed domains to determine whether the domain of the URL is non-shareable; and
in response to determining that the domain of the URL is non-shareable, applying a blurring filter to a screen area occupied by the web browser.

19. The method of claim 16, wherein identifying the non-shareable elements includes:
detecting a notification that appears in a notification area in the screen content of the host machine;
identifying an associated application that the host machine associates with the notification;
comparing the associated application with a list of blocked applications or a list of allowed applications to determine whether the associated application is non-shareable; and
in response to determining that the associated application is non-shareable, applying a blurring filter to the notification area.

20. The method of claim 16, wherein identifying the non-shareable elements includes:
identifying a set of folders open on the host machine;
comparing the set of folders with a list of blocked folders or a list of allowed folders to identify a set of non-shareable open folders; and
for each of the set of non-shareable open folders, applying a blurring filter to a screen area occupied by the non-shareable open folder.

21. The method of claim 16, further comprising associating different non-shareable elements with respective levels of blurring, such that different non-shareable elements are blurred to different degrees.

22. The method of claim 16, further comprising providing a UI (user interface control) associated with a non-shareable element, the UI control being operable by a user of the host machine to selectively unblur the associated non-shareable element, such that the client machine displays the non-shareable element without blurring.

23. A computerized apparatus, comprising control circuitry that includes a set of processors coupled to memory, the control circuitry constructed and arranged to:

render the screen content of the host machine in a first window on the client machine;

identify multiple screen regions formed by image features within the first window;

receive, by the client machine, a user selection of a set of selected screen regions within the first window, the set of selected screen regions including at least one of the multiple screen regions but excluding a set of unselected screen regions in the first window; and in response to the user selection, creating a second window on the client machine, the second window containing screen content within the set of selected screen regions but excluding screen content within the set of unselected screen regions.

24. A computer program product including a set of non-transitory, computer-readable media having instructions which, when executed by control circuitry of a computerized apparatus, cause the computerized apparatus to perform a method of displaying screen content of a host machine, the method comprising:

rendering the screen content of the host machine in a first window on the client machine;

identifying multiple screen regions formed by image features within the first window;

receiving, by the client machine, a user selection of a set of selected screen regions within the first window, the set of selected screen regions including at least one of the multiple screen regions but excluding a set of unselected screen regions in the first window; and in response to the user selection, creating a second window on the client machine, the second window containing screen content within the set of selected screen regions but excluding screen content within the set of unselected screen regions.

\* \* \* \* \*